N. Starr, Jr.,
Horse Power.
Nº 54,433. Patented May 1, 1866.
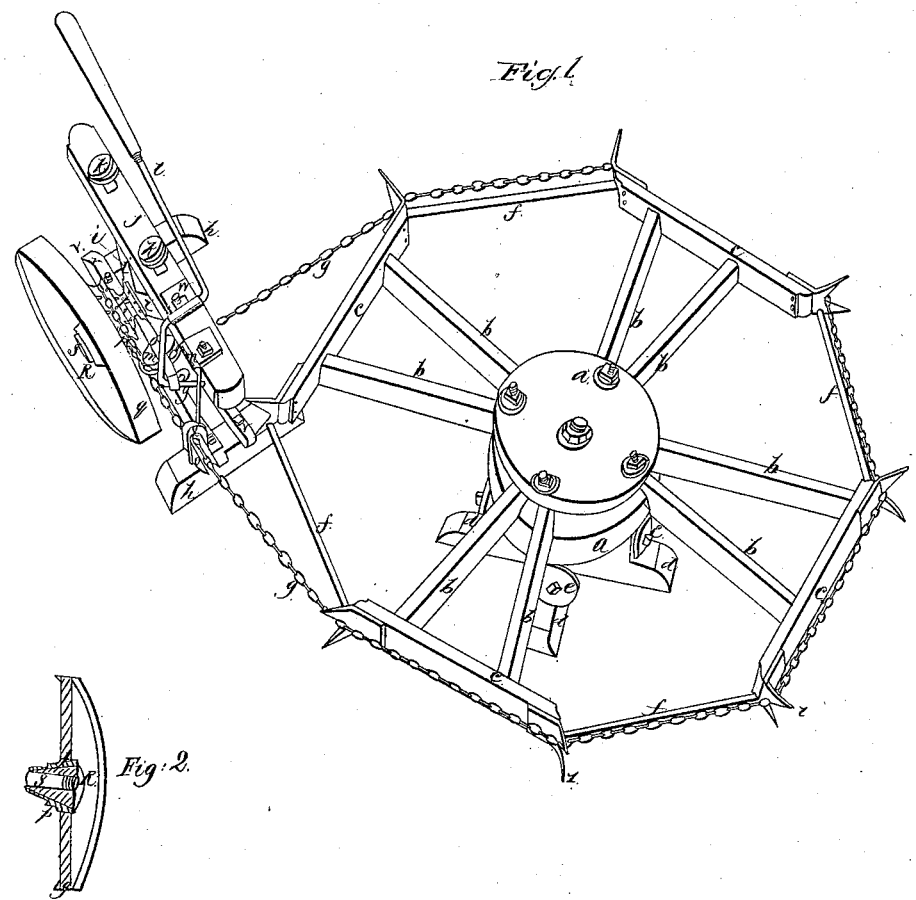
Witnesses:
Chas. Foster
R. H. Duell
Inventor:
N. Starr Jr.

United States Patent Office.

NICHOLAS STARR, JR., OF HOMER, NEW YORK.

IMPROVEMENT IN HORSE-POWERS.

Specification forming part of Letters Patent No. 54,433, dated May 1, 1866.

*To all whom it may concern:*

Be it known that I, NICHOLAS STARR, Jr., of Homer, in the county of Cortland and State of New York, have invented a new and useful Improvement in Horse-Powers; and I do hereby declare that the following is a full, clear, and exact description of the same, and of its construction and operation, reference being had to the annexed drawings, making a part of this specification, in which—

Figure I is a perspective view of the improvement and machine entire, and Fig. II is a cross-section of the fly-wheel and pinion, like letters referring to like parts in each.

This power is intended to be used with a chain for communicating motion.

$d$ $d$ represent a foundation frame-work with the friction-wheels $e$ $e$, upon which the reel rotates. The reel is constructed by placing the spokes or beams $b$ $b$ in pairs near each other, and connecting each pair by a cross-piece, $c$, projecting beyond the points of connection with such spokes, and putting a catch, 1 1, upon the ends of each cross-piece. These cross-pieces should be equal in length to the space between the catches on the different cross-pieces, and so that the catches shall be equidistant around the reel. The reel is further strengthened by rods connecting the different cross-pieces $f$ $f$. By this arrangement space is obtained between the different pairs of spokes for horses to travel and the reel is made stronger, as there is nearly double the number of spokes usually obtained. The reel also may be made smaller and the catches for the chain nearer together than when placed upon the ends of the spokes, and, of course, there is less trouble from slack chain.

$h$ $h$ are cross foundation-timbers connected by the ties $r$ $r$. Between these rise the supports $i$ $i$, diagonally crossing and bracing each other. At their intersection is the pin upon which the fly-wheel and small reels connected therewith run. Upon the top of these diagonal supports is placed the timber $j$, held in position by screws $k$ $k$, passing through slots in said timber. From the point $n$ on said timber is suspended the swing-pulley $o$, with a swivel-joint at $x$, which holds up the chain as it comes off the small reels $p$ $p$ by the point at $m$ and swivel at $x$. It accommodates itself to the chain whether upon the larger or smaller of the small reels.

$l$ is a weighted lever with fulcrum at $w$, the hither end bent downward and sustaining the pulley $m$, which guides the chain in its passage to the small reels. By means of the lever the pulley is pressed or drawn toward the large reel and the chain kept taut. By a pin at $y$ this pulley is adjusted to carry the chain onto the larger or smaller of the small reels. After the apparatus is set for operation the chain is tightened or loosened by moving forward or backward the adjustable timber or cap-piece $j$, with which the pulleys $o$ and $m$ also move.

$p$ $p$ are different-sized reels attached to the fly-wheel $q$, by using one or the other of which greater or less motion is obtained in the fly-wheel.

$q$ is the fly-wheel, with the small reels $p$ $p$ running upon a section of a cone, R, with its base outward. This cone screws into the pin $s$. If the fly or cone wear, by turning the cone on the pin $s$ the cone is carried forward by the screw on the pin, and the joint made by the cone and the fly is made as tight or close as desired. The base of the cone being outward, it prevents the fly-wheel from running off.

What I claim, and desire to secure by Letters Patent, is—

1. The arrangement, in the large reel, of placing the spokes in pairs and connecting them by cross-pieces which shall extend beyond the spokes, as and for the purposes described.

2. The weighted lever $l$, in combination with the pulley $m$.

3. The adjustable cap-piece $f$, in combination with the pulley $m$ and lever $l$, substantially as described.

4. The combination of the wheel G, cone R, and reels $p$ $p$, when the same are arranged and operate substantially as above described.

N. STARR, JR.

Witnesses:
B. B. WOODWORTH,
JAS. A. NIXON.